United States Patent Office 3,486,839
Patented Dec. 30, 1969

3,486,839
PRODUCTION OF NYLON FIBER OF IMPROVED
HEAT RESISTANCE
Arthur M. Howald, Perrysburg, Ohio, assignor, by mesne
assignments, to Soo Valley Company, Columbia, S.C.,
a corporation of South Carolina
No Drawing. Filed Oct. 14, 1965, Ser. No. 496,142
Int. Cl. D06m 3/30
U.S. Cl. 8—115.5                                    4 Claims

ABSTRACT OF THE DISCLOSURE

The melting point of nylon fiber is increased by reacting it at a temperature not greater than 180° C. with a polyepoxy compound in which at least one of the epoxy radicals is attached to an aliphatic group.

---

The present invention relates to the production of nylon fiber of improved heat resistance.

The high temperature applications of nylon fiber are limited by the melting point of the fiber, because nylon fiber cannot be used at a temperature that is high enough to cause it to melt or soften. For example, an important potential application of nylon monofilament is in the stitching of automobile upholstery. Nylon monofilament is transparent so that it could be used with upholstery of any color. This potential application of nylon monofilament is impeded by the fact that machines used for stitching automobile upholstery operate at very high speeds so that the thread becomes quite hot. The melting point of nylon fiber is low enough so that the fiber would soften and break at the temperatures which are attained in such machines.

The relatively low melting point of nylon fiber has excluded nylon fiber from various other important high temperature applications.

In general, attempts to increase the melting point of nylon by chemical modification have been unsuccessful because the introduction of a substituent on the carbon chains or on the nitrogen atoms has been found to reduce the melting point of the polymer.

The principal object of the invention is the production of nylon fiber of improved heat resistance. More specific objects and advantages are apparent from the following description, which is intended to disclose and illustrate and not to limit the invention.

The present invention is based upon the discovery that the melting point of nylon fiber can be increased substantially by reacting the nylon fiber with a polyepoxy compound in which at least one of the epoxy radicals is attached to an aliphatic group, at an elevated temperature below the melting point of the nylon fiber. Such a substance cannot be reacted with the nylon before it is formed into fiber, because the resulting reaction product would be infusible and otherwise unsuitable for fiber formation.

The nylon fiber used in the practice of the present invention is a filament consisting essentially of the present invention is a filament consisting essentially of a long chain synthetic polymeric amide which has recurring amide groups as an integral part of the main polymer chain, in which the structural elements are oriented in the direction of the axis of the filament. In the preparation of the nylon it is desirable to avoid the use of chain stoppers, so as to leave as many free reactive groups as possible. For best results, the residual monomer content of the nylon should be reduced as low as possible by extracting the residual monomer in accordance with known practice, and in the practice of the invention, the reaction should be carried out in the absence of air to prevent oxidation.

Preferably, the substance which is reacted with the nylon fiber has a melting point that is substantially lower than the melting point of the fiber, so that the reaction can be carried out by immersing the nylon fiber in the molten substance.

In a polyepoxy compound that is used for reaction with nylon fiber in the practice of the present invention, at least one of the epoxy radicals must be attached to an aliphatic group. An example of a polyepoxy compound which may be used for the reaction is a vinylcyclohexene dioxide having the following structural formula:

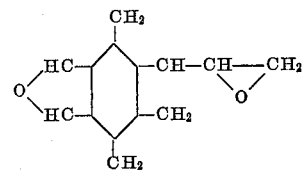

Other polyepoxides which can be used for the reaction include the dioxides of divinyl benzenes, and diepoxy compounds obtained by the known reaction of two moles of epichlorohydrin with one mole of a dihydric phenol in the presence of an alkali. Other polyepoxy compounds which can be used may be obtained by the reaction of one mole of a diamine with two moles of epichlorohydrin or two moles of ethylene oxide. Many such polyepoxy compounds are available commercially.

The upper extreme of reaction temperature for nylon–6 in the practice of the present invention is about 180° C., because such a high reaction temperature tends to cause a decrease in strength of the nylon thread.

Example 1

A charge of a vinylcyclohexene dioxide (a liquid having a boiling point of 227° C.) was placed in a large test tube having a stopper equipped with a thermometer, a nitrogen inlet tube extending to the bottom of the test tube, and a nitrogen outlet tube. This apparatus was used to treat a coil of nylon thread which was a monofilament of nylon-6 having a low monomer content. A sample of the nylon thread weighing .067 gram was immersed in the cold liquid and the liquid then was heated at about 130 to 140° C. for about six hours. This treatment caused an increase in weight of about seven percent, and caused the melting point of the thread to increase to 450° F., as compared with the original melting point of 430° F.

Example 2

The procedure of Example 1 was repeated, using the same nylon thread. The weight of the nylon thread was .0755 gram, and the nylon thread was immersed in the liquid epoxide. After seven and one half hours at temperatures between 145 and 149° C., the nylon thread was removed, washed in benzene and acetone, and dried. The weight of the thread was found to have increased 42 percent. The melting point of the treated thread was then determined by securing the thread at one end, passing the thread over an aluminum cylinder two inches in diameter and hanging a small weight on the other end of the thread. The aluminum cylinder was then gradually heated by means of an internal electric heater and the temperature of the aluminum cylinder was observed to determine the temperature at which the thread fused and broke. In two determinations, the melting point of samples of the treated thread was found to be 269° C. and 275° C., as compared with the original melting point of 224° C. for the untreated thread.

EXAMPLE 3

The procedure of Example 2 was repeated, the thread in this case being wrapped around an aluminum ring one inch in diameter, covered with a layer of nylon foil. The original weight of the thread used was 0.29 gram. After immersion in the diepoxide for six and one half hours at a temperature of about 150° C., the ring carrying the thread was washed with benzene and acetone and was allowed to stand in the air overnight. The thread was found to have increased in weight by 21.4 percent. In two tests of the treated thread, the melting point was found to be 277° C. and 284° C. The tensile strength of the treated thread was found to be substantially the same as the original tensile strength of the untreated thread.

Having described the invention, I claim:

1. A method of producing nylon fiber of improved heat resistance wherein the improvement comprises the step of increasing the melting point of nylon fiber by reacting it at a temperature not greater than 180° C. in the absence of aid with a diepoxide of the class consisting of vinylcyclohexene dioxide, dioxides of divinyl benzenes, and diepoxy compounds produced by the reaction of two moles of epichlorohydrin with one mole of a dihydric phenol in the presence of an alkali.

2. A method of producing nylon fiber of improved heat resistance wherein the improvement comprises the step of increasing the melting point of nylon fiber by reacting it at a temperature not greater than 180° C. in the absence of air with a vinylcyclohexene dioxide.

3. Nylon fiber of improved heat resistance, produced by reacting nylon fiber at a temperature not greater than 180° C. in the absence of air with a diepoxide of the class consisting of vinylcyclohexene dioxide, dioxide of divinyl benzenes, and diepoxy compounds produced by the reaction of two moles of epichlorohydrin with one mole of a dihydric phenol in the presence of an alkali, and having a melting point higher than that of the unreacted nylon fiber.

4. Nylon fiber of improved heat resistance, produced by reacting nylon fiber at a temperature not greater than 180° C. in the absence of air with a vinylcyclohexene dioxide, and having a melting point higher than that of the unreacted nylon fiber.

References Cited

UNITED STATES PATENTS

| | | | |
|---|---|---|---|
| 2,597,163 | 5/1952 | Michaels | 8—115.5 |
| 2,721,811 | 10/1955 | Dacey et al. | 8—115.5 X |
| 2,786,732 | 3/1957 | Gabler | 8—115.5 |
| 2,862,281 | 12/1958 | Klausner | 8—115.5 X |
| 2,903,381 | 9/1959 | Schroeder | 8—115.5 X |
| 3,007,763 | 11/1961 | Adams | 8—115.5 X |

HERBERT B. GUYNN, Primary Examiner

U.S. Cl. X.R.

260—78, 830